S. W. LUITWIELER.
COMBINED CUT-OFF AND RELIEF VALVE.
APPLICATION FILED FEB. 28, 1913.

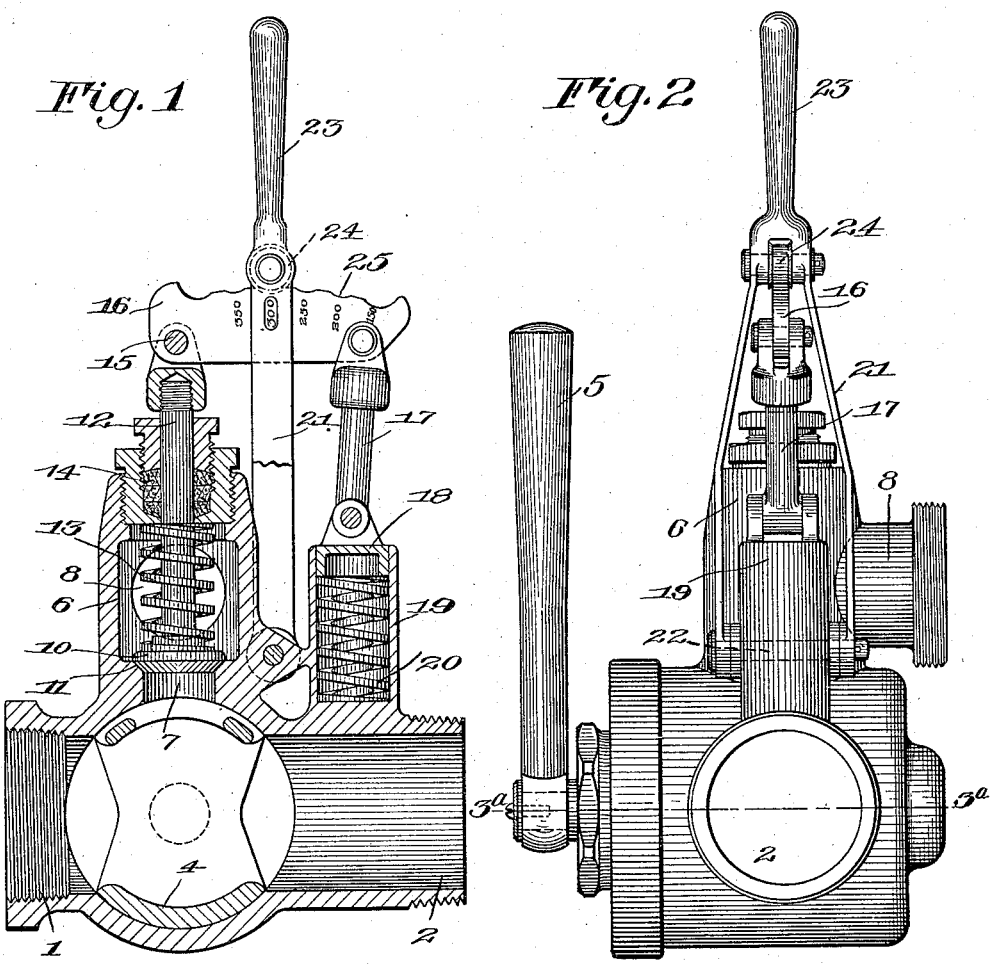

1,152,114.

Patented Aug. 31, 1915.
2 SHEETS—SHEET 2.

Witnesses
H. E. Stonebraker
Nelson H. Copp

Inventor
Samuel W. Luitwieler
By
his Attorneys

UNITED STATES PATENT OFFICE.

SAMUEL W. LUITWIELER, OF ROCHESTER, NEW YORK.

COMBINED CUT-OFF AND RELIEF VALVE.

1,152,114.     Specification of Letters Patent.     Patented Aug. 31, 1915.

Application filed February 28, 1913. Serial No. 751,249.

*To all whom it may concern:*

Be it known that I, SAMUEL W. LUIT-WIELER, of Rochester, in the county of Monroe and State of New York, have invented certain new and useful Improvements in Combined Cut-Off and Relief Valves; and I do hereby declare the following to be a full, clear, and exact description of the same, reference being had to the accompanying drawings, forming a part of this specification, and to the reference-numerals marked thereon.

My invention relates to a combined cut-off and relief valve for pumping engines, having reference more particularly to a coupling for fire engines, and it has for one of its objects to afford a compact device of simple construction that is capable of performing the functions of both a positive cut-off, and a pressure relief, to prevent the hose from being subjected to excessive pressure.

A further object of my invention consists in providing means for readily changing the amount of resistance offered by the relief valve in high pressure systems, where it is necessary to obtain, at times, an instantaneous as well as a substantially adjustment in the control of the valve.

To these and other ends the invention consists in certain improvements and combinations of parts all as will hereinafter be more fully described, the novel features being pointed out in the claims at the end of the specification.

Figure 3:
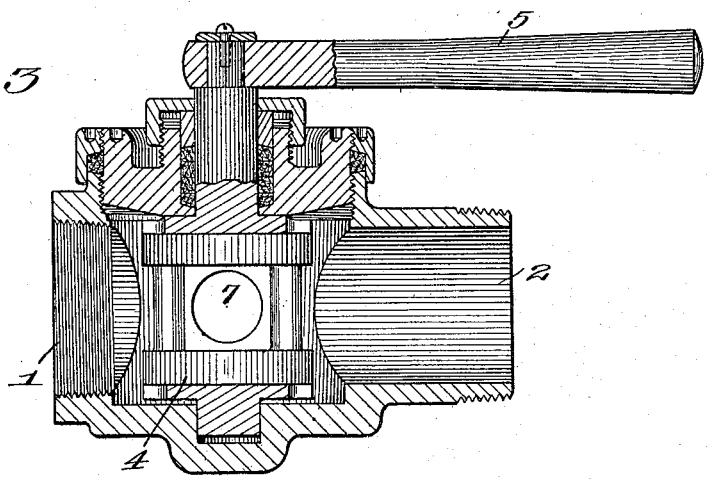
Figure 4:
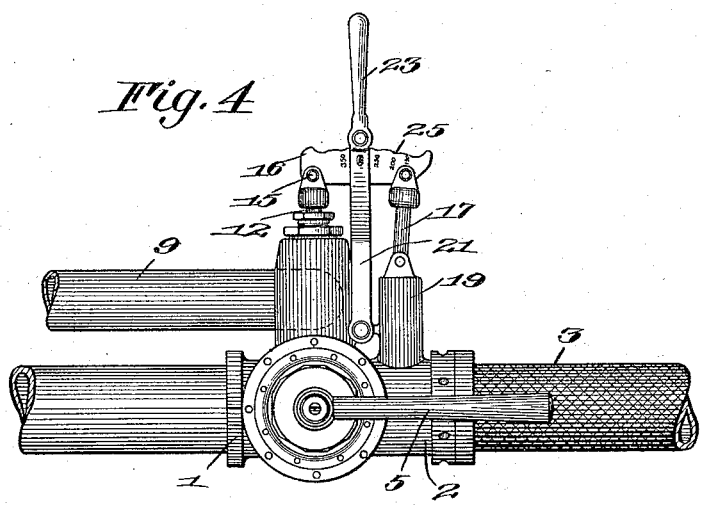

In the drawings: Figure 1 is a vertical sectional view of a coupling constructed in accordance with one embodiment of my invention; Fig. 2 is an end elevation of the same; Fig. 3 is a horizontal sectional view on the line 3ª—3ª of Fig. 2, and Fig. 4 is a side elevation of the coupling in operative position.

Similar reference numerals throughout the several figures indicate the same parts.

In the present embodiment of the invention, the device comprises a threaded inlet 1 adapted to be connected with a suitable pipe leading from the pumping engine, and 2 is a threaded outlet which is connected in the usual manner with the hose 3.

4 is a turning plug or cut-off valve disposed in the passage between the inlet and the outlet, and controlled by a handle 5 so as to permit the water to flow through the coupling into the hose, or to be entirely shut off when desired.

Arranged above the plug 4 is a valve chamber 6 connected to the lower part of the coupling by a port 7 which is arranged at an angle to the inlet port 1, and is preferably vertically disposed, as shown. The valve chamber 6 is provided with the outlet 8 which may connect with a suitable return pipe 9 for conveying the surplus pressure of water back to the pump or to some other discharge. Arranged for movement within the valve chamber 6 is a reciprocatory spring-actuated relief valve 10 arranged to engage the seat 11 and mounted on the valve stem 12.

13 is a spring disposed between the stuffing box 14 and the upper face of the valve whereby to hold the latter normally against its seat. The upper end of the valve stem 12 is pivotally connected at 15 to a link 16, the latter being in turn pivotally arranged on the rod 17. 18 is a piston which is pivotally supported on the rod 17 and is movable vertically in the piston chamber 19, while 20 is a spring arranged in said chamber and acting to retain the upward movement of the valve 10, and also to assist the spring 13 in holding the valve normally closed.

Pivotally disposed between the piston chamber 19 and the valve chamber 6 is a lever embodying standards 21 which are pivoted at 22. The lever includes a handle 23 and is preferably provided with an antifriction roller 24 which coöperates with the notches 25 on the link 16. The link 16 pivots about the anti-friction roller 24 on the lever, that is to say, when the parts are in the position shown in Fig. 1, if sufficient pressure is applied to lift the relief valve, the left hand end of the link 16 is moved upwardly, while the opposite end is moved in a downward direction against the action of the spring 20. By moving the lever to the right, the pivotal point of the link 16 is changed so as to decrease the amount of resistance offered to raising the valve. A graduated scale may be applied to one face of the link 16 to indicate different pressures corresponding to the several notches. When it is desired to hold the relief valve closed, the lever may be moved to the extreme left and is then in a position to prevent any upward movement of the valve.

In using the coupling, the pressure controlling lever is set at the desired point according to the amount of pressure which the hose is capable of sustaining. When it is necessary to change the resistance of the valve, as for different pressures or for different strengths of hose, the lever is moved to the right or left and the adjustment is quickly obtained, and in a manner that enables the amount of pressure resistance to be accurately determined in advance. Furthermore, if it becomes necessary to lock the relief valve against movement, this can be done instantaneously by merely throwing the controlling lever toward the left as far as it will go. This feature is of great advantage in devices of this character, for the reason that when dealing with high water pressures, it is impracticable to make any adjustment when the pressure is on, unless it can be done quickly and with no great effort. That is to say, in the present device the ease with which the adjustment can be obtained does not depend upon the pressure exerted, as the controlling lever can be moved quite readily under any conditions and is effective to readily increase or decrease the resistance of the relief valve to a nicety, within wide limits.

I claim as my invention:

1. In a coupling for pumping engines, the combination with a reciprocating spring actuated valve, of a link connected at one end to said valve and at its opposite end to a spring controlled piston, a chamber within which said piston is movable, and a pivoted lever adapted to engage the link at various points between its ends.

2. In a coupling for pumping engines, the combination with a valve chamber, of a piston chamber disposed adjacent to and extending parallel with the valve chamber, a spring-actuated valve movable in the valve chamber, a spring-actuated piston movable in the piston chamber, a link connecting the piston and the valve, said link having a series of notches on its upper edge, and a lever pivoted between the valve chamber and the piston chamber and having an anti-friction roller adapted to engage one of the notches in said link.

3. The combination with a valve chamber, of a piston chamber extending parallel with the valve chamber, a spring actuated valve movable in the valve chamber, a spring actuated piston movable in the piston chamber, a link connecting the piston and the valve, and a lever pivoted between the valve chamber and the piston chamber and arranged to engage said link at different points thereon.

4. The combination with a valve chamber, of a piston chamber, a valve movable in the valve chamber, a piston movable in the piston chamber, a link connecting the piston and valve, said link having a series of notches on the side opposite to the piston and valve chambers, and a lever pivoted between the valve chamber and piston chamber and having engagement with said notched side of the link, the lever being adjustable to opposite sides of the center of the link.

SAMUEL W. LUITWIELER.

Witnesses:
H. E. STONEBRAKER,
RUSSELL B. GRIFFITH.

Copies of this patent may be obtained for five cents each, by addressing the "Commissioner of Patents, Washington, D. C."